Patented Apr. 13, 1937

2,076,794

UNITED STATES PATENT OFFICE 2,076,794

EMULSIFYING AGENTS

Charles E. Sando, Washington, D. C.

No Drawing. Application May 14, 1935, Serial No. 21,384

9 Claims. (Cl. 252—6)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

My invention relates to the art of emulsions, more particularly to emulsifying agents, and of those agents to such as are sapogenins, or their salts, and to those emulsions which include water as an ingredient.

There is still much to be desired in the art of producing satisfactory emulsions. A serious drawback to some emulsions is a lack of stability or that property which permits them to remain homogeneous for a reasonable length of time. Many emulsions must be produced with great care and consideration as to the temperature involved and the mechanical manipulation employed. While a great many materials have been proposed as emulsifying agents, many are employed in specific application, others can only be used in nonedible products and the majority require the use of relatively large quantities of the emulsifying agent. Furthermore, an ideal emulsifying agent is one which overcomes these difficulties to a marked extent and at the same time produces satisfactory emulsions by the use of relatively small quantities of the emulsifying agent.

An object of my invention is to provide an emulsifying agent which will impart relative stability to emulsions of water and oils, fats, waxes, hydrocarbons and substances of a similar nature.

Also an object of my invention is to provide an emulsifying agent which will in many cases give satisfactory results over a relatively wide range of temperatures.

Also an object of my invention is to provide an agent which will produce satisfactory emulsions in which a great many other substances may be mixed or incorporated without destroying the essential characteristics of such emulsions.

Also an object of my invention is to provide an emulsifying agent which is non-toxic. For this purpose, for example, the free sapogenin or the sodium salt of oleanolic acid, ursolic acid or other sapogenin may be employed.

Also an object of my invention is to provide an emulsifying agent which will produce satisfactory results by using relatively small quantities of the emulsifying agent. In some cases the amount of emulsifying agent employed may be as low as 0.2% to 0.3% by weight of the ingredients.

Furthermore, an object of my invention is to provide an emulsifying agent whose use is characterized by its simplicity.

I have found that vegetable, animal and mineral oils, fats, waxes, hydrocarbons, and other materials of an oily nature insoluble or difficultly soluble in water or not miscible therewith, whether solid or liquid, can be converted into emulsions with water which are relatively stable by employing sapogenins or their alkali, alkaline earth or other metallic salts, especially the sodium salt, although not necessarily limited to this particular salt, as emulsifying agents. In the case of sapogenins, it has been found that those containing at least one carboxyl group in the molecule produce the most satisfactory emulsion.

The sapogenins are aromatic polyterpene-like bodies of vegetable origin containing a nucleus of probably 5 condensed benzene rings. While a considerable number of the sapogenins have been isolated and studied their exact constitution is still unknown and even the empirical formulas in some cases are still in doubt. Attached to the various rings of the sapogenin nucleus are usually one or more hydroxyl groups, numerous methyl groups and in many of them at least one carboxyl group. It has been the practice to name anew each sapogenin isolated, giving it a name suggestive of the plant source from which it was isolated, such as hederagenin, sugar beet sapogenin, elemic acid, and sumaresinolic acid, etc. Actually many of these sapogenins are identical as has been shown to be the case with sugar beet sapogenin, guagenin, taraligenin, viscumic acid and caryophyllin all of which are in reality oleanolic acid, $C_{30}H_{48}O_3$, which occurs on the surface of the grape, on the clove bud, in the sugar beet and on olive leaves, etc. It has also been shown that urson, malol, and prunol are now identical with ursolic acid, $C_{29}H_{46}(OH)COOH$, which is found widely distributed in plants and of particular interest as a constituent of the skins of the apple, pear and cranberry. The sapogenins are solids composed of carbon, hydrogen and oxygen, which occur in plants either free or combined and are insoluble in water, but fairly soluble in alcohol, acetone, ether and chloroform. A number of the members of this class of compounds form metallic salts some of which may be readily obtained in the crystalline state, for example, the sodium salts of oleanolic and ursolic acids. Oleanolic and ursolic acids may be recovered by known methods from readily available by-products such as the pomace obtained from apples, pears, grapes and cranberries and from solids accumulating in the still heads during the distillation for clove oil. For purposes of this application the sapogenins are considered as aglycones and not in the form of their glucosides which are distinguished from the former by being for the most part soluble in water.

When oil and water are intimately mixed either by vigorous hand shaking or mechanical stirring one of the liquids will be subdivided into small drops, but on standing a short while these drops combine together into larger drops and finally the mixture separates into its two components. However, if some appropriate substance, herein called "an emulsifying agent" is added to the oil and water, and the mixture properly agitated there results an intimate mixture, known as an emulsion. Under the microscope it can be seen that one component has been subdivided into tiny droplets which are suspended in the other component. If the droplets are oil and the medium water, the emulsion is called the oil-in-water type. If the droplets are water suspended in the oil, it is then of the water-in-oil type.

The mixture of a liquid and solid insoluble therein is known as "a suspension" and any substance which renders a suspension more stable or permanent may be referred to as "a suspending agent".

For purposes of this application the term "emulsifying agent" is used to include a suspending agent, since it is very difficult to differentiate between the two cases. For example I describe later on melted lard emulsions which are true emulsions only as long as the temperature remains above the melting point of the lard. After cooling the lard becomes solid and we then have a mixture of water and the solid lard.

Also herein I use the term "emulsion" to include the water-in-oil type, where the water is the dispersed phase and the oil the continuous phase, and to include also a suspension which under certain conditions heretofore explained may be a true emulsion but under certain other conditions may be a relatively stable mixture of water and solid.

The following examples will illustrate how my invention may be carried out in practice, but the invention is not limited to these examples.

Example 1

50 grams of olive oil are gently warmed and 0.30 gram of finely divided dry sodium oleanolate added with stirring. After uniform consistency has been attained, 100 grams of water are slowly added and the mixture further stirred. A heavy, creamy white emulsion results which is relatively stable. The length of stirring may be varied, but a better emulsion results with increased agitation.

Example 2

50 grams of melted petrolatum are stirred while 0.20 gram of finely divided dry sodium ursolate is added. After vigorous stirring, 100 grams of water are slowly added with agitation and the stirring continued until the mixture has reached ordinary temperature. A stiff creamy emulsion results.

Example 3

50 grams of liquid petrolatum are heated and while stirring 0.30 gram of finely divided dry sodium ursolate added. To this mixture, 100 grams of water are slowly added with stirring. A further small quantity of emulsifier and then 50 grams of water are also added. A creamy white emulsion results.

Example 4

50 grams of melted lard are gradually added with stirring to 50 grams of a substantially aqueous medium containing 0.75 gram of sodium ursolate in colloidal solution or suspension. Stirring is continued until the emulsion is creamy, then 100 grams of cold water added slowly. A thick creamy white suspension results if agitation is continued until normal temperature is reached.

Example 5

50 grams of cold corn oil are gradually added with stirring to 50 grams of a substantially aqueous medium containing 0.30 gram of sodium ursolate in colloidal solution or suspension. 50 grams of an aqueous acid liquid containing, for example, slightly more than sufficient vinegar or similar acid to regenerate the free ursolic acid, are slowly added with agitation. A creamy, white emulsion results.

Example 6

20 grams of liquid petrolatum, 10 grams of paraffin wax, 10 grams of petrolatum are melted and while stirring, 0.35 gram of sodium ursolate colloidally dispersed or suspended in 50 grams of water are slowly added. When creamy 50 grams of water are slowly added with stirring. At ordinary temperature a stiff emulsion results.

Example 7

50 grams of cold olive oil are stirred while 0.35 gram of sodium ursolate colloidally dispersed or suspended in 50 grams of a substantially aqueous medium are added. The addition of another 50 grams of water with stirring forms a fairly stiff, white emulsion. A further addition to this emulsion, with stirring, of one teaspoon dry mustard, one teaspoon salt, and two tablespoons vinegar does not alter the essential characteristics of the emulsion.

Example 8

50 grams of melted, partly hydrogenated cotton seed oil (Crisco) are stirred with 0.4 gram finely divided oleanolic acid, and then 25 grams of liquid petrolatum added. While stirring 100 grams of warm water are slowly added. As normal temperature is reached, the mixture forms a stiff, creamy white emulsion resembling cold cream. The admixture with this emulsion of 1 teaspoon boric acid does not alter the essential characteristics of the emulsion.

Example 9

25 grams of corn oil are heated to about 90° C. and 0.4 gram finely divided, powdered betulin added after which 75 grams hot water are slowly added with vigorous stirring. Agitation is continued until normal temperature is reached. An amber-colored viscous emulsion results.

Example 10

25 grams carbon tetrachloride are stirred; 0.2 gram finely divided dry ursolic acid added and then 75 grams water. Vigorous agitation produces a white emulsion.

It is evident from the above examples that there are a number of methods of producing the emulsions and also that other oils, fats, waxes and similar substances or mixtures of such substances can be used in place of the materials cited. Furthermore, a great many other substances than those mentioned in Example 7 may be mixed or incorporated into the original emulsions without altering their essential characteristics. It is desired that the invention be construed as broadly as the claims taken in conjuncton with the prior art may allow.

I claim as my invention:

1. An emulsion comprising a continuous oily phase, an aqueous dispersed phase and a sapogenin.

2. An emulsion comprising water, an oily substance, and a sapogenin.

3. An emulsion comprising water, a substance of an oily nature difficultly soluble in water and immiscible therewith, and a sapogenin.

4. An emulsion comprising water, an oily substance, and ursolic acid.

5. An emulsion comprising water, an oily substance, and oleanolic acid.

6. An emulsion comprising water, an oily substance, and betulin.

7. An emulsion comprising water, an oily substance and at least one of the substances of the group consisting of sapogenins and their salts.

8. An emulsion comprising water, an oily substance and a salt of a sapogenin.

9. An emulsion comprising water, a substance immiscible therewith and at least one of the substances taken from the group consisting of sapogenins and their salts.

CHARLES E. SANDO.